United States Patent
Graf et al.

(10) Patent No.: US 10,641,426 B2
(45) Date of Patent: May 5, 2020

(54) SEALING INNER SLEEVE HAVING A DEFORMABLE INTERMEDIATE SECTION

(71) Applicant: GRAF PATENTVERWERTUNGS GBR, Bad Dürrheim (DE)

(72) Inventors: Jürgen Graf, Bad Dürrheim (DE); Joachim Graf, Bad Dürrheim (DE)

(73) Assignee: GRAF PATENTVERWERTUNG GBR, Bad Duerrheim (DE)

( * ) Notice: Subject to any disclaimer, the term of this patent is extended or adjusted under 35 U.S.C. 154(b) by 809 days.

(21) Appl. No.: 14/783,900

(22) PCT Filed: May 2, 2014

(86) PCT No.: PCT/DE2014/100155
§ 371 (c)(1),
(2) Date: Oct. 12, 2015

(87) PCT Pub. No.: WO2014/194886
PCT Pub. Date: Dec. 11, 2014

(65) Prior Publication Data
US 2016/0053932 A1  Feb. 25, 2016

(30) Foreign Application Priority Data
Jun. 4, 2013 (DE) .......... 10 2013 210 365

(51) Int. Cl.
*F16L 55/163* (2006.01)
*F16J 15/08* (2006.01)

(52) U.S. Cl.
CPC ......... *F16L 55/163* (2013.01); *F16J 15/0881* (2013.01)

(58) Field of Classification Search
CPC ....... F16L 55/18; F16L 55/162; F16L 55/163; F16L 55/165; F16J 15/0881; F16J 15/26; F16J 15/28
USPC .......................... 285/15–16, 370, 382.4, 397
See application file for complete search history.

(56) References Cited

U.S. PATENT DOCUMENTS 2,695,795 A * 11/1954 Tamminga .......... F16L 19/0218
                                                    119/14.01
2,696,264 A * 12/1954 Colmerauer .......... E21B 43/086
                                                    138/120
3,347,569 A * 10/1967 Lindgren .............. F16L 13/002
                                                    285/257

(Continued)

FOREIGN PATENT DOCUMENTS

DE      296 04 954 U1     5/1996
DE      100 17 711 A1     10/2001
(Continued)

OTHER PUBLICATIONS

International search report for related application PCT/DE2014/100155 dated Jul. 16, 2014.

*Primary Examiner* — Anna M Momper
*Assistant Examiner* — Fannie C Kee
(74) *Attorney, Agent, or Firm* — William Gray Mitchell

(57) ABSTRACT

A sealing inner sleeve for insertion into pipes in order to seal leaks therein. The sealing inner sleeve has a locking device allowing an increase in the diameter of the sealing inner sleeve, but blocking same in the opposite direction, the sealing inner sleeve having two end sections and an intermediate section connecting said end sections to form a contiguous component.

10 Claims, 6 Drawing Sheets

(56) References Cited

U.S. PATENT DOCUMENTS

| | | | |
|---|---|---|---|
| 6,273,634 B1 * | 8/2001 | Lohbeck | E21B 17/08 |
| | | | 166/207 |
| 6,789,822 B1 * | 9/2004 | Metcalfe | B21D 39/04 |
| | | | 166/206 |
| 2009/0126436 A1 * | 5/2009 | Fly | E21B 43/105 |
| | | | 72/58 |

FOREIGN PATENT DOCUMENTS

| | | | |
|---|---|---|---|
| DE | 10 2010 015483 A1 | 10/2010 | |
| EP | 07 95714 A1 | 9/1997 | |
| JP | 09072484 A * | 3/1997 | F16L 55/18 |

\* cited by examiner

SEALING INNER SLEEVE HAVING A DEFORMABLE INTERMEDIATE SECTION

CROSS REFERENCE TO RELATED APPLICATIONS

This patent application claims priority to International Patent Application PCT/DE2014/100155, filed on May 2, 2014, and thereby to German Patent Application 10 2013 210 365.4, filed on Jun. 4, 2013.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention relates to a sealing inner sleeve having a deformable intermediate section.

Background of the Invention

Sealing inner sleeves are widely known and described for example in DE 44 01 318 C2. With the help of such sealing inner sleeves leakages can be repaired, e.g., in underground pipes made from concrete or another material, without digging being necessary. For this purpose, the sealing inner sleeve is inserted into the leaking pipe to be repaired until it reaches the place of the leak. Here, initially the sealing inner sleeve is spirally contracted so that it shows a smaller diameter than the pipe to be sealed. Once the sealing inner sleeve has been moved to the place of the leak of the pipe to be repaired, using a mechanical assembly unit said sealing inner sleeve is expanded until, under compression of the sealing rings, it has tightly contacted the interior wall of the pipe. Using a locking device, which comprises a clamping sprocket combing a row of teeth and an elastic blocking latch engaging these teeth, the sealing inner sleeve is kept in its expanded position.

A locking device, improved in reference thereto, is suggested in EP 0 805 932 B1. Here, a sealing inner sleeve is disclosed with a locking device that allows very small latching steps and thus, upon the expansion being concluded, ensures a tight, lasting contacting of the interior wall of the pipe with a high pressure upon the sealing organs. For this purpose, the improved locking device is provided with a slot arranged in the circumferential direction at the interior end of the band, with a row of teeth being arranged respectively at its two opposite longitudinal edges. Two clamping sprockets are provided in the slot, each of which combing one of the two rows of teeth and simultaneously being impinged by a common blocking sprocket as the latching organ. The blocking sprocket is pressed via a clamping spring into the space between the two clamping sprockets.

These sealing inner sleeves are best suited to be inserted into straight pipelines, in order to seal here cracked walls, for example. For this purpose, the sealing inner sleeves are provided at their external circumference with a sealing means, particularly an elastic coating, such as a rubber hose for example, which may show one or more circumferential sealing lips, and then it is moved with a so-called packer to the damaged point of the pipeline to be repaired. The packer with the sealing inner sleeve is brought into position and then inflated via the entrained air hose; here the sealing inner sleeve also potentially expands until it seals the pipe section to be repaired. The locking device ensures that the sealing inner sleeve maintains this position even when the packer is removed again.

However, in practice, pipelines are frequently damaged, in which two adjacent pipe sections show a radial offset. This may be caused particularly by an offset pipe coupling. Additionally, in pipelines it may occur that pipes with different diameters are connected to each other. Damages in such pipes showing a radial offset or different diameters cannot be repaired with the above-described sealing inner sleeves, because the sealing inner sleeves in the locked and exterior-supported state show a high deformation resistance, similar to that of a circumferentially closed pipe and thus they cannot be deformed.

This problem can be solved with a sealing inner sleeve as described in EP 0 795 714 A1. This sealing inner sleeve is characterized by an intermediate section arranged between two end sections of the sealing inner sleeve, which shows a lesser resistance to deformation when bent about the longitudinal axis compared to the end sections of the sealing inner sleeve. The reduced resistance to deformation is here possible by material weakening and/or a bellow-like embodiment. Here, among other things, a punctual or corrugated punching of the sealing inner sleeve is suggested in the intermediate section as the material weakening. The plurality of slots distributed here in a circumferential direction in the intermediate section of the sealing inner sleeve is arranged in the idle state of the sealing inner sleeve, i.e. in the still non-deformed state of the sealing inner sleeve, axially parallel in reference to each other and the center axis of the sealing inner sleeve.

This is the foundation for the present invention.

The objective of the invention is to further develop these sealing inner sleeves of prior art such that on the one hand, good deformation of the sealing inner sleeve in the intermediate section is ensured, but sufficient stability still remains of the sealing inner sleeve when used in pipes to be repaired that show radial offsets and/or different diameters. In particular, with the sealing inner sleeve it should also be possible to repair pipes that are arranged at a slight angle in reference to each other.

This objective is attained by a sealing inner sleeve showing the features as claimed herein.

BRIEF SUMMARY OF THE INVENTION

In a preferred embodiment, a sealing inner sleeve (10) to be inserted into a pipe in order to seal leakages there, comprising an annularly contracted and expandable band (12), preferably made from sheet steel, with its band parts overlapping in the circumferential direction at least partially, and with a locking device (20) allowing an increase in diameter of the sealing inner sleeve (10), however blocking any deformation in the opposite direction, whereby the sealing inner sleeve (10) comprises two end sections (14, 15) and an intermediate section (16) connecting them to a contiguous component, and whereby a plurality of longitudinal slots (30) is arranged in the intermediate section (16), separated from each other and distanced by a plurality of longitudinal webs (40) arranged in the circumferential direction, wherein the longitudinal slots (30, 130) and the longitudinal webs (40, 140) are arranged with a predetermined angular offset aslant in reference to the center axis (X) of the sealing inner sleeve (10) on the circumference of said sealing inner sleeve (10).

In another preferred embodiment, the sealing inner sleeve (10) as described herein, wherein a first group of longitudinal slots (30) and longitudinal webs (40) is provided, showing an angular offset ranging from approximately 5 degrees to approximately 20 degrees, preferably from approximately 8 degrees to 12 degrees, and furthermore, preferably amounting to approximately 10 degrees, and/or that at least one second group of longitudinal slots (130) and longitudinal webs (140) is provided, showing an angular offset in reference to the center axis (X) at a range from approximately more than 45° and less than 90°, preferably amounting to at least approximately 75°.

In another preferred embodiment, the sealing inner sleeve (10) as described herein, characterized in that all longitudinal slots (30) and longitudinal webs (40) of the first group are arranged parallel in reference to each other.

In another preferred embodiment, the sealing inner sleeve (10) as described herein, characterized in that the longitudinal slots (30) of the first group are at least approximately one to five times wider than the longitudinal webs (40) in the circumferential direction of the sealing inner sleeve (10).

In another preferred embodiment, the sealing inner sleeve (10) as described herein, characterized in that the longitudinal slots (30) of the first group are rounded or angular at their end sections (41), (42).

In another preferred embodiment, the sealing inner sleeve (10) as described herein, characterized in that the longitudinal webs (40) are enlarged in a bulging fashion, seen in the circumferential direction of the sealing inner sleeve (10) at a middle section (43).

In another preferred embodiment, the sealing inner sleeve (10) as described herein, characterized in that the intermediate section (16) of the sealing inner sleeve (10) amounts to approximately 0.2 to 0.5 of the total length Z, seen in the direction of the center axis (X) of the sealing inner sleeve (10).

In another preferred embodiment, the sealing inner sleeve (10) as described herein, characterized in that the sealing inner sleeve (10) shows in the first group approximately 10 to 120 longitudinal slots (30).

In another preferred embodiment, the sealing inner sleeve (10) as described herein, characterized in that at least the intermediate section (16) of the sealing inner sleeve (10), provided with the longitudinal slots (30, 10, 130), is covered by a cover, particularly a metallic film.

In another preferred embodiment, the sealing inner sleeve (10) as described herein, characterized in that the longitudinal slots (30) of the first group are arranged between the longitudinal slots (130) of two second groups of longitudinal slots (130).

In another preferred embodiment, the sealing inner sleeve (10) as described herein, characterized in that the longitudinal slots (130) of the second group are narrower than the longitudinal slots (130) of the first group.

In a preferred embodiment, a sealing inner sleeve (10) as described herein, characterized in that the longitudinal slots (130) of the second group show a width of approximately 3 to 7 mm and a length of approximately 10 to 15 cm, and are limited by longitudinal webs (140), which are approximately 1 to 5 mm wide.

In another preferred embodiment, the sealing inner sleeve (10) as described herein, characterized in that the two additional groups of longitudinal slots (130) are arranged symmetrically in reference to a perpendicular of the center axis (X) and aslant with a predetermined angular offset.

In another preferred embodiment, the sealing inner sleeve (10) as described herein, characterized in that the area of the second group of longitudinal slots (130) is smaller than the area of the first group of longitudinal slots (130) in reference to the length of the sealing inner sleeve in the direction of the center axis (X).

DETAILED DESCRIPTION OF THE INVENTION

Figure 1:
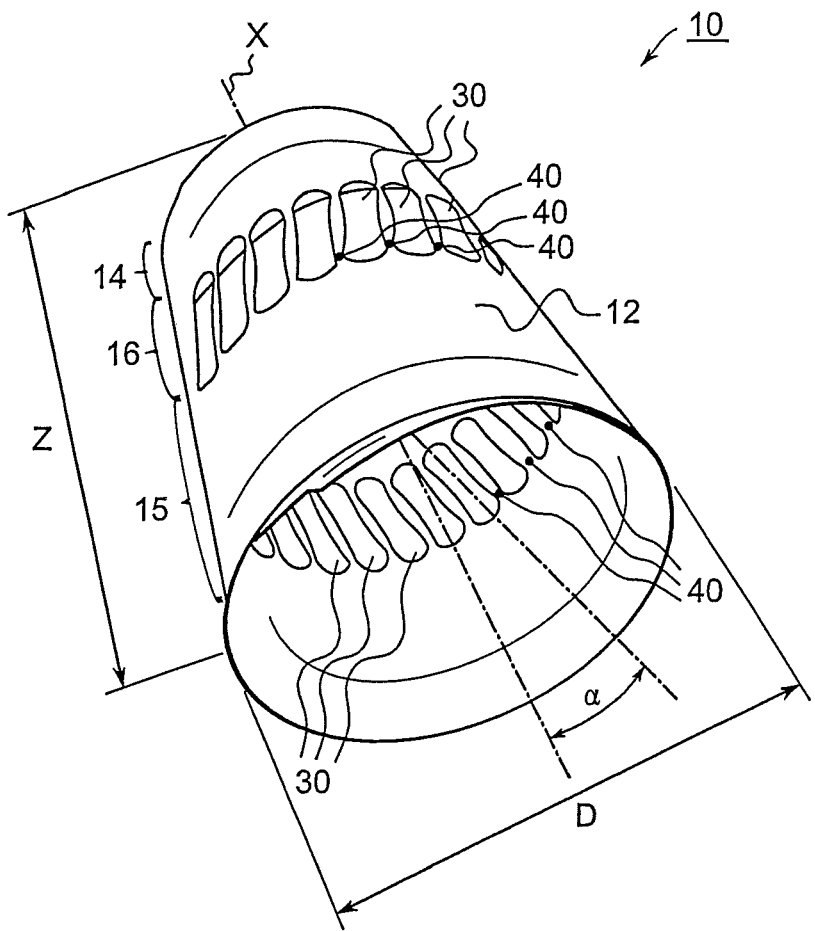
FIG. 1 is a line drawing evidencing an exemplary embodiment of the sealing inner sleeve in the wound state seen diagonally from the front.
Figure 2:
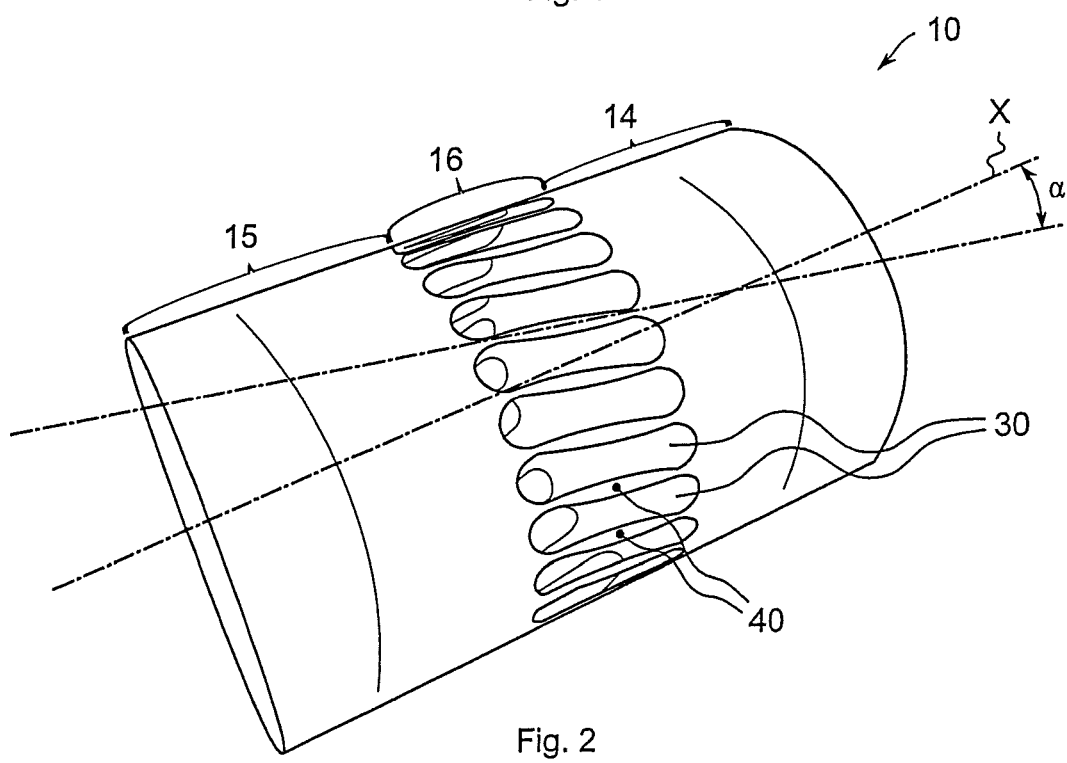
FIG. 2 is a line drawing evidencing the sealing inner sleeve of FIG. 1 in a side view.

The invention is essentially based on the fact that a plurality of longitudinal slots at the exterior circumference of the sealing inner sleeve is arranged, which in reference to the center axis of the sealing inner sleeve show an angular offset. This means that a plurality of longitudinal slots is aligned diagonally in reference to the center axis of the sealing inner sleeve.

Experiments have shown that a plurality of longitudinal slots at the circumference of the sealing inner sleeve must be distributed ranging from approximately greater than 45° and less than 90° in reference to the center axis X of the sealing inner sleeve, if the sealing inner sleeve shall also be used for leaks of pipes arranged at a slight offset in reference to each other. An angular offset by more than 45° and less than 90° of these longitudinal slots also means that the longitudinal slots show an angle of less than 45° and more than 0° in reference to a perpendicular in reference to the center axis of the sealing inner sleeve.

In a preferred embodiment of the longitudinal slots, they are preferably placed from 55° to 85° and further preferred at an angle of approximately 75° in reference to the center axis X of the sealing inner sleeve.

In one embodiment of the invention, the longitudinal slots may be approximately 3 to 7 mm wide and approximately 10 to 15 cm long and limited by longitudinal webs, which are approximately 1 to 5 mm wide. Such an arrangement of longitudinal slots is best suited for sealing leaks in pipes arranged at an angle in reference to each other.

The pipes to be sealed are generally made from a plurality of abutting pipe sections. Here, it frequently occurs that individual pipe sections are not precisely aligned to each other axially. In addition to a slight angular alignment of abutting pipes, which can be sealed with the above-mentioned longitudinal slots when leaks appear, there are also constellations in which the abutting pipe sections are offset axially in reference to each other, thus showing a radial offset or showing different diameters. In order to allow effective sealing of such pipes as well, the invention provides, in addition to the above-mentioned group of longitudinal slots or instead thereof, another group of longitudinal slots, which are aligned less aslant in reference to the center axis of the sealing inner sleeve. Experiments have shown that the angular offset of this group of longitudinal slots ideally ranges from approximately 5 degrees to 20 degrees and should amount preferably to approximately 10 degrees. With such an angular offset of the longitudinal slots in reference to the center axis of the sealing inner sleeve, good deformation of the sealing inner sleeve is possible here and high stability is ensured as well, even when the sealing inner sleeve is inserted in pipelines showing a radial offset and/or different diameters.

In the following the group of longitudinal slots with the lesser angular offset, i.e. the longitudinal slots provided to repair pipelines with radial offset and/or different diameters, is called the first group of longitudinal slots, while the other longitudinal slots, aligned more aslant in reference to the center axis than the first group of longitudinal slots, are called the second group of longitudinal slots.

Preferably, all longitudinal slots are aligned in groups parallel to their diagonal alignment. Here, the individual longitudinal slots are separated from each other by longitudinal webs.

In a further development of the invention, it is provided that the longitudinal slots of the first group are embodied, in reference to the circumferential direction of the sealing inner sleeve, approximately one to five times wider than the longitudinal webs.

The longitudinal webs of the first group may be shaped rounded or angular at their ends. Here it is also possible, or in a further development independent there from, that the longitudinal webs in their middle, seen in the circumferential direction, are embodied bulging, i.e. in their central area they are wider than in their two end sections.

Additionally, it has proven advantageous to size the intermediate section of the sealing inner sleeve such that it is equivalent to approximately 0.2 to 0.5 of the total length of the sealing inner sleeve. Preferably, the intermediate section of the sealing inner sleeve is placed centrally in reference to the two end sections embodied with an equal length. The two end sections of the sealing inner sleeve can here for example each show a length from 0.25 to 0.4 in reference to the total length of the sealing inner sleeve.

In one embodiment of the invention, it is provided that the sealing inner sleeve in its intermediate section shows a first group of longitudinal slots, with this first group of longitudinal slots at their two sides being framed respectively by a second group of longitudinal slots. The two second groups of longitudinal slots may here show their longitudinal slots at an alignment parallel to each other, or be aligned to one side of the first group of longitudinal slots diagonal in one direction, and at the other end of the first group of longitudinal slot aligned diagonally in the opposite direction in reference to the perpendicular of the center axis of the sealing inner sleeve. In a further development of the invention it is provided that the sealing inner sleeve at its exterior circumference is covered, at least in the area of the intermediate section, i.e. where the longitudinal slots of the first and/or the second group are provided, with a cover, particularly a film or a metal sheet. This may for example involve a metallic film, particularly a stainless steel film or a stainless steel sheet, which shows for example a thickness from approximately 0.3 mm to 0.7 mm. This film and/or sheet is wound about the exterior circumference of the sealing inner sleeve, at least in the area of the longitudinal slots about the sealing inner sleeve. However, it is also possible to wrap up the entire sealing inner sleeve at the exterior with such a film or such a sheet. The sense and purpose of such a cover is to cover the longitudinal slots. The sealing inner sleeve provided with such a cover shall then preferably be provided with a suitable sealing material on the outside. This sealing material may be a rubber-like hose, which is pulled at the outside over the sealing inner sleeve and preferably shows at the exterior circumference one or more circumferential sealing lips. The sealing inner sleeve prepared with such a pulled-on rubber-like hose and cover can then be moved by the packer mentioned at the outset to the point of the pipeline to be repaired and placed there.

In one embodiment of the invention, the longitudinal slots of the second group are embodied narrower than the longitudinal slots of the first group. Here, the longitudinal slots of the second group may show a width from approximately 3 to 7 mm and a length from approximately 10 to 15 cm, with the longitudinal slots here being limited by longitudinal webs, which show a width from approximately 1 to 5 mm.

DETAILED DESCRIPTION OF THE FIGURES

FIG. 1 shows a sealing inner sleeve with a perspective view from the front. The sealing inner sleeve is provided with the reference character 10 and shows a coiled, metallic band 12, with its band parts overlapping at the ends. In this coiled state, the sealing inner sleeve 10 is held by a locking device located in the interior, not discernible in FIG. 1. The locking device is here embodied such it allows a widening with regard to the diameter of the sealing inner sleeve 10, however blocks any deformation in the opposite direction. Suitable locking mechanisms and locking devices are widely known, for example from DE 44 01 318 C2 and EP 0 805 932 B1 mentioned at the outset.

In the state shown, the sealing inner sleeve 10 is a cylindrical body with a center axis X. The sealing inner sleeve 10 shows two end sections 14, 15 with an intermediate section 16 located between these. Here, the end sections 14, 15 are massive metal sections, while the intermediate section 16 comprises a plurality of longitudinal slots 30 extending in the circumferential direction of the sealing inner sleeve 10, which are distanced by the longitudinal webs 40.

The longitudinal slots 30 and the longitudinal webs 40 of the sealing inner sleeve 10 are aligned towards the center axis X at an angular offset α and thus placed diagonally in reference to the center axis X. This angular offset α may range from approximately 5 to 20 degrees, preferably amounting at least approximately to 10 degrees. The longitudinal slots 30 and the longitudinal webs 40 are explained in greater detail in the context with FIG. 3. Overall, for example 10 to 120, preferably 25 to 35 longitudinal slots 30 may be implemented in the sealing inner sleeve 10 by way of punching or cutting out.

The sealing inner sleeve 10 shows a total length Z, for example from 40 cm to 80 cm. The above-mentioned central section 16 may here range from 0.2 to approximately 0.5 of this total length Z. The two end sections 14, 15 are preferably each embodied with identical length in reference to the center axis X and show a length from approximately 0.25 to 0.4 of Z. The diameter D of the sealing inner sleeve 10 may for example range from 20 to 80 cm in the stressed state. Nevertheless, other dimensional ratios are also possible.

Figure 3:
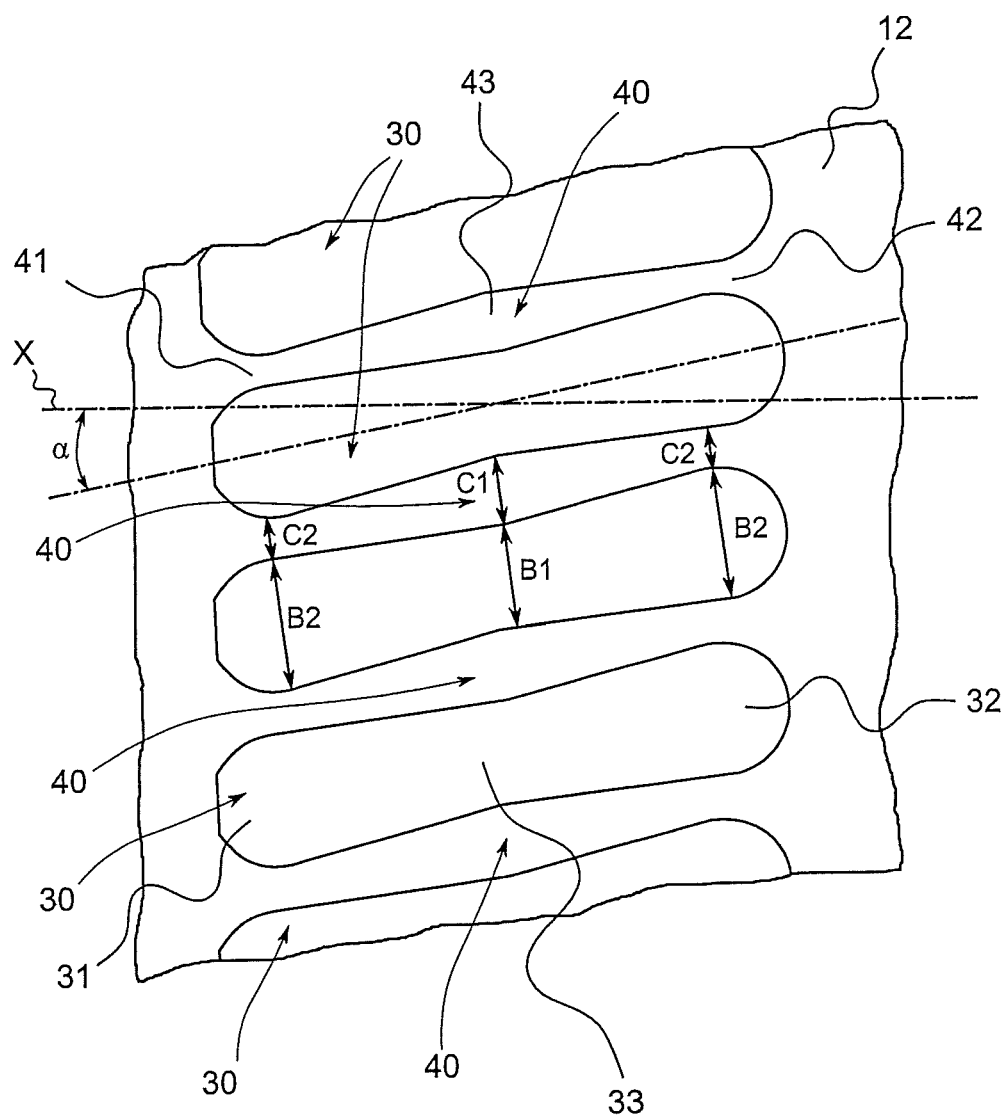
FIG. 3 is a line drawing evidencing an enlarged detail of the sealing inner sleeve shown in FIG. 2 in the area of the longitudinal slots.

FIG. 3 shows the detail of the metallic band 12 in the area of the longitudinal slot 30 and the longitudinal webs 40 in an enlarged view. Once more, the angular offset α from the center axis X is discernible. The longitudinal slot 30 is embodied like a spoon, with respectively rounded sections at its longitudinal ends. The longitudinal slots 30 show a maximum width of B2 at their ends. The width is reduced in the middle of the longitudinal slots 30 and amounts to B1. B1 may for example be 2 cm, while B2 is 2.5 cm. The longitudinal webs 40 are designed appropriately and show therefore in the center a maximum width C1 and at their ends a minimum width C2. C1 may for example be 1 cm and C2 0.5 cm. Other size ratios are also possible. In the concrete exemplary embodiment of FIG. 3 the slots show a total length of approximately 10 cm. Such an arrangement of the longitudinal slots 30 and the longitudinal webs 40 is optimal with regard to the connection possibilities, on the one hand, and the stability of the sealing inner sleeve 10, on the other hand.

Figure 4:
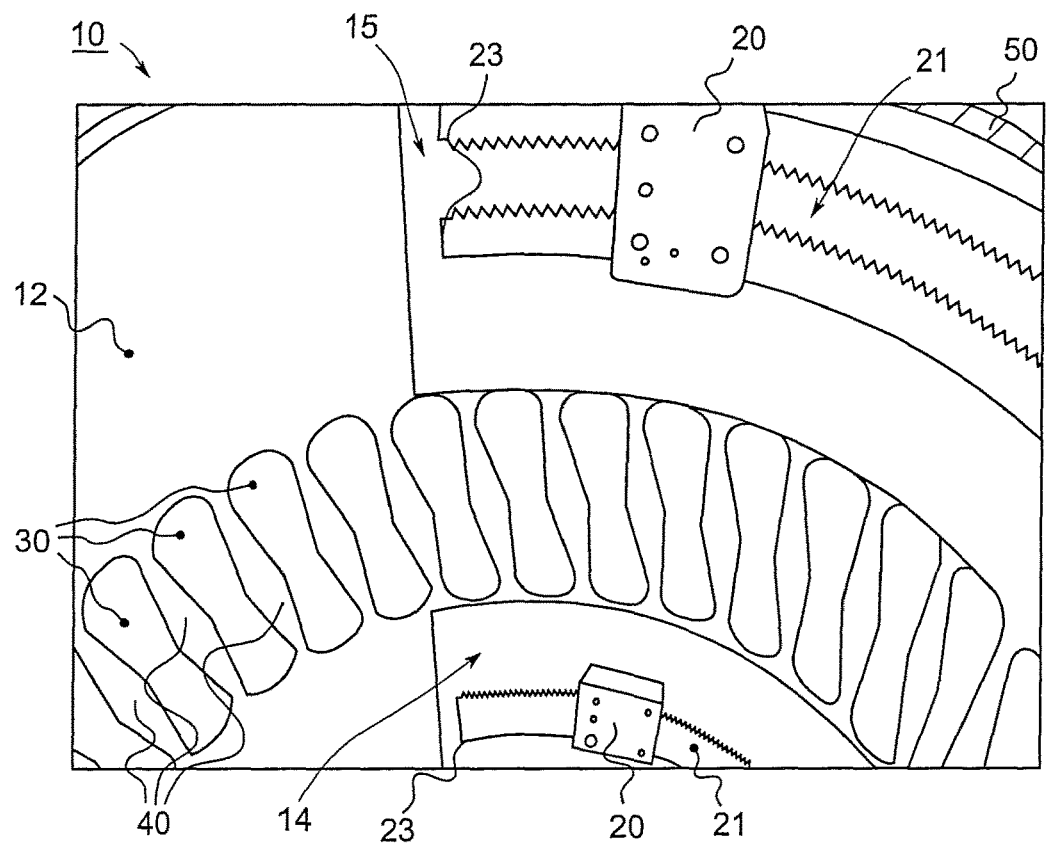
FIG. 4 is a line drawing evidencing a focused view upon a detail inside the sealing inner sleeve in the stressed state in a pipe with a constant diameter.
Figure 5:
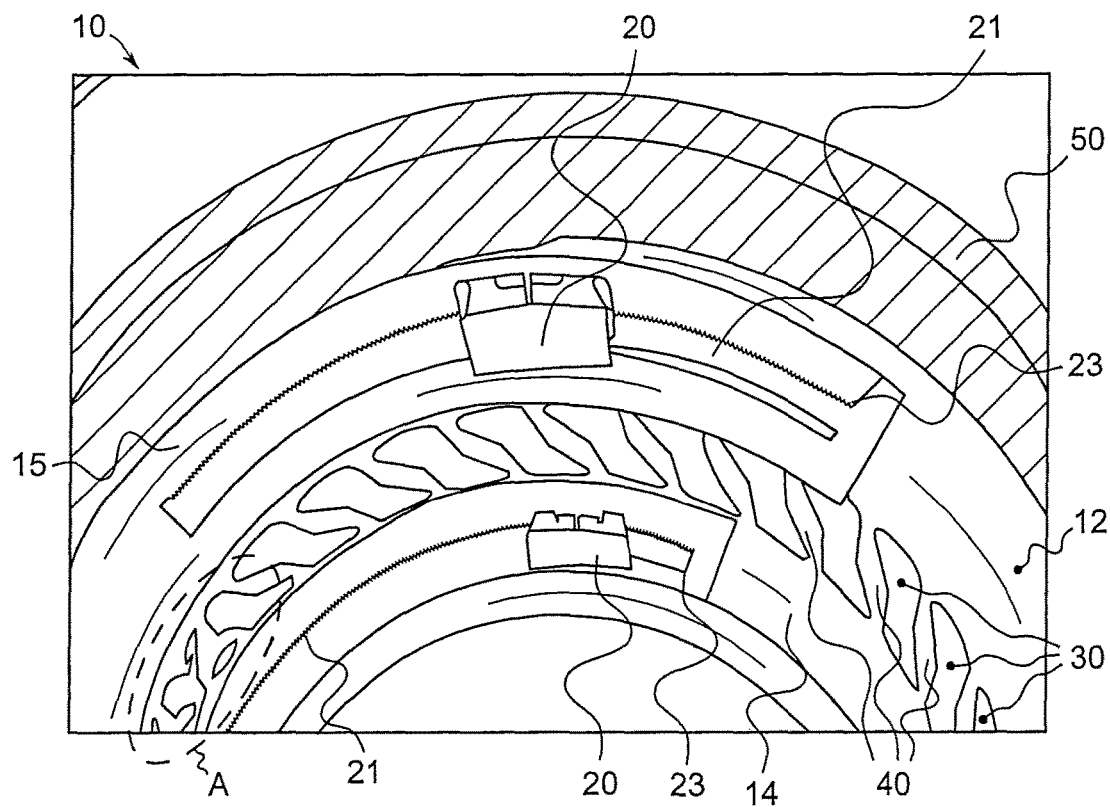
FIG. 5 is a line drawing evidencing a focused view upon a detail inside a pipe with different diameters equipped with a stressed sealing inner sleeve according to FIGS. 1 to 4.

This is shown based on the views of the interior of sealing inner sleeve of FIGS. 4 and 5.

FIG. 4 shows a view of a detail inside the sealing inner sleeve 10 in the stressed state in a pipeline 50 with a constant diameter and without any radial offset. Two locking devices 20 are discernible from FIG. 4, which respectively extend to a toothed rod 21. Both locking devices 20 are located approximately at the same distance from the stop 23 of the toothed rod 21 and are therefore equally stressed. The longitudinal slots 30 and the longitudinal webs 40 are all aligned parallel in reference to each other, because neither any radial offset nor a change in diameter of the pipeline affects the sealing inner sleeve 10 in FIG. 4.

FIG. 5 shows the sealing inner sleeve 10 of FIG. 4 stressed in a sealing fashion in a pipeline 50 with a change in diameter and/or radial offset. It is clearly discernible that the rear locking device 20 facing away from the viewer is placed much closer to the stop 23 of the locking device 20 than the frontal locking device 20 facing the viewer. This means that the locking devices 20 have stressed the end sections 14, 15 to a different extent due to the given radial offset and/or the given change in diameter of the pipeline 50. Here, the sealing inner sleeve 10 is deformed in the intermediate section with the longitudinal slots 30 and the longitudinal webs 40, distorted in particular, which is particularly discernible in FIG. 5 in the area marked with the reference character A. Here, the longitudinal slots 30 and/or longitudinal webs 40 intersect between the exterior and interior band section of the band 12 of the sealing inner sleeve 10.

The longitudinal slots 30 and the longitudinal webs 40 used in the exemplary embodiments discussed thus far are best suited to seal those sections of pipes that show a radial offset or a change in diameter. The above-mentioned longitudinal slots 30 and the longitudinal webs 40 may well compensate such a radial offset or such a change in diameter based on the particular diagonal position of the longitudinal slots 30, when the sealing inner sleeve 10 is stressed inside the pipe section to be repaired. These previously discussed longitudinal slots 30 form a first group. When repairing pipes however, pipe sections also appear that may be aligned at a slight angle in reference to each other. This means that the pipe sections abutting each other show center axes extending diagonally in reference to each other. Such diagonal alignments may show a few degrees, for example ranging from 0° to 10 or 20°. In order to allow sealing even such diagonally extending pipeline sections when necessary, the above-mentioned first group of longitudinal slots is not suitable.

In the following exemplary embodiments of FIGS. 6 to 9 therefore sealing inner sleeves are introduced, in which a second group of longitudinal slots are also provided, which are placed considerably more aslant in reference to the center axis X of the sealing inner sleeve 10 than the above-discussed longitudinal slots 30. The longitudinal slots discussed in the following are called hereinafter the second group of longitudinal slots and indicated with the reference character 130. These longitudinal slots 130 of the second group are distanced by the longitudinal webs 140.

At this point, it shall once more be pointed out that, depending on the application, it is sufficient to arrange in the sealing inner sleeve 10 longitudinal slots 30 of the first group or longitudinal slots 130 of the second group. However, in order to provide a universally suitable sealing inner sleeve 10, it is recommended to provide at the circumference of the sealing inner sleeve 10 both the longitudinal slots 30 of the first group, as well as the longitudinal slots 130 of the second group.

FIGS. 6 to 9 show sealing inner sleeves 10, in which both the longitudinal slots 30 of the first group as well as the longitudinal slots 130 of the second group are implemented. In this way, FIG. 6 now shows a sealing inner sleeve 10, as already presented in the context of FIG. 1, whereby now however a second group of longitudinal slots 130 is also provided, which are considerably more aslant than the longitudinal slots 30 of the first group, distributed at the circumference of the sealing inner sleeve 10. These longitudinal slots 130 of the second group are placed at both sides of the longitudinal slots 30 of the first group. All of these longitudinal slots 130 of the second group are aligned parallel in reference to each other and placed at an angle β in reference to the center axis X, which is greater than 45° and less than 90°.

Figure 6:
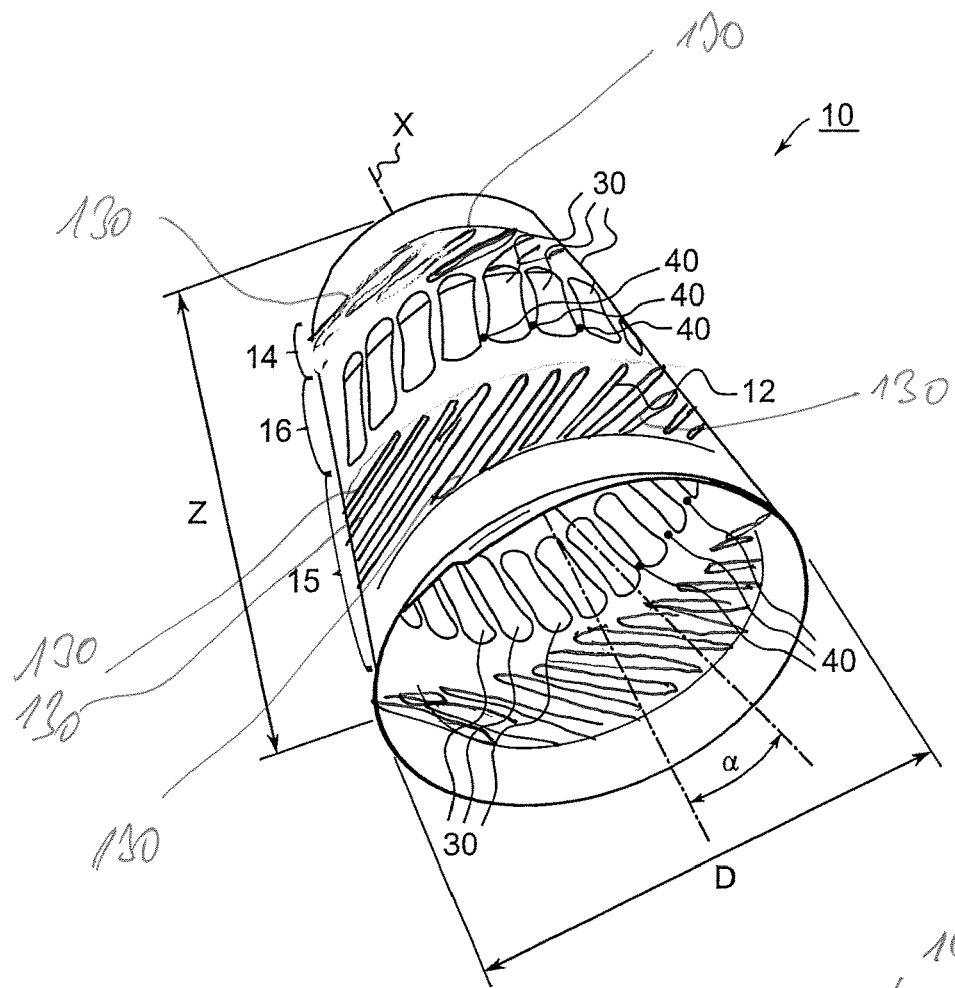
FIG. 6 is a line drawing evidencing an illustration similar to FIG. 1, however now additional longitudinal slots are arranged at the exterior circumference of the sealing inner sleeve, in order to allow sealing pipe sections aligned angularly offset in reference to each other.
Figure 7:
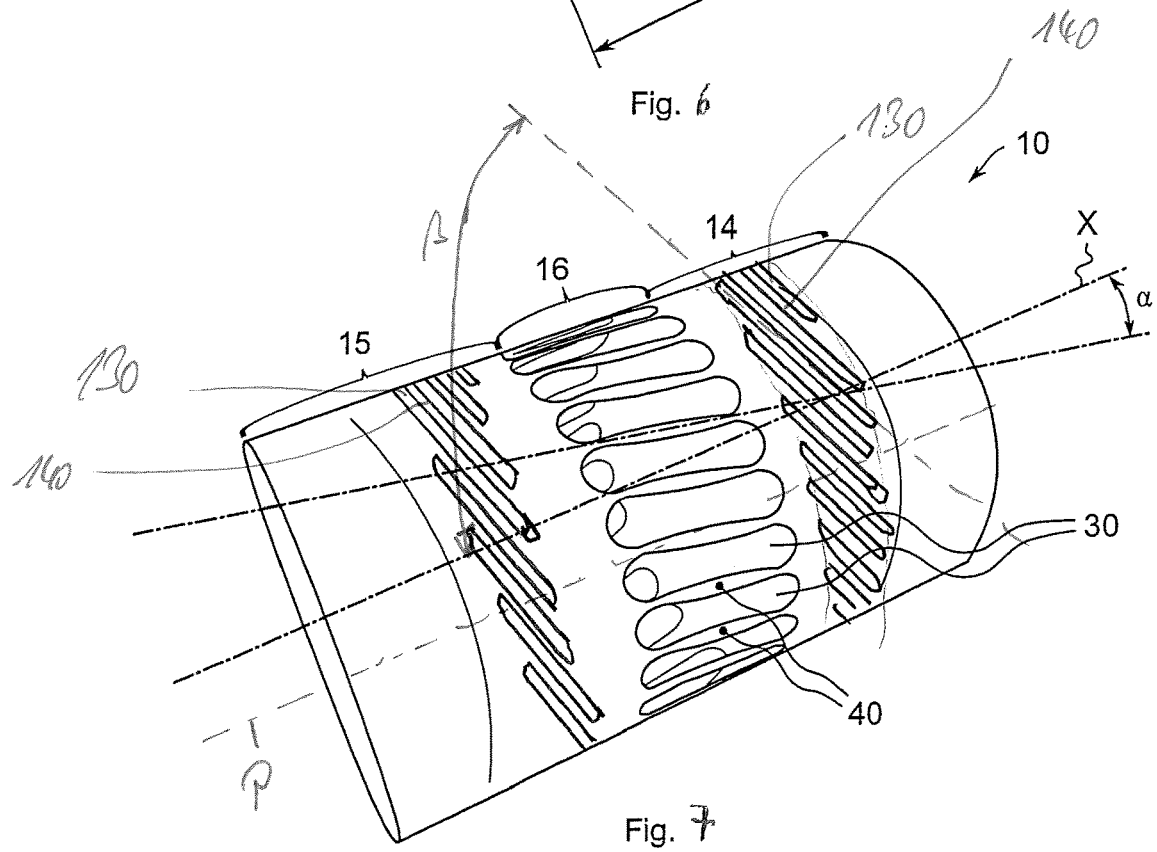
FIG. 7 is a line drawing evidencing the sealing inner sleeve of FIG. 6 in a side view.

Most preferably, the angle β ranges from 55° to 85°, whereby it has proven beneficial with the concrete exemplary embodiment to adjust the angle to approximately 75°. In FIGS. 6 and 7 the angle β amounts to 75°.

As shown in FIGS. 6 and 7 the longitudinal slots 130 of the second group are designed considerably narrower than the longitudinal slots 30 of the first group. The longitudinal slots 130 of the second group are separated by longitudinal webs 140, which are also relatively narrow. This way the longitudinal slots 130 of the second group may show a width from approximately 3 to 7 mm, and a length from approximately 10 to 15 cm. The longitudinal webs 140 are approximately 1 to 5 mm wide, assuming that the sealing inner sleeve 10 shows, for example, an interior diameter of 25 cm to 40 cm.

The illustration of FIG. 7 shows particularly clearly that the length of the longitudinal slots 130 of the second group is selected such that a virtual parallel P in reference to the center axis X intersects several longitudinal slots 130 on the circumferential surface of the sealing inner sleeve 10. In the exemplary embodiment of FIG. 7 such a parallel P intersects e.g. three longitudinal slots 130.

Figure 8:
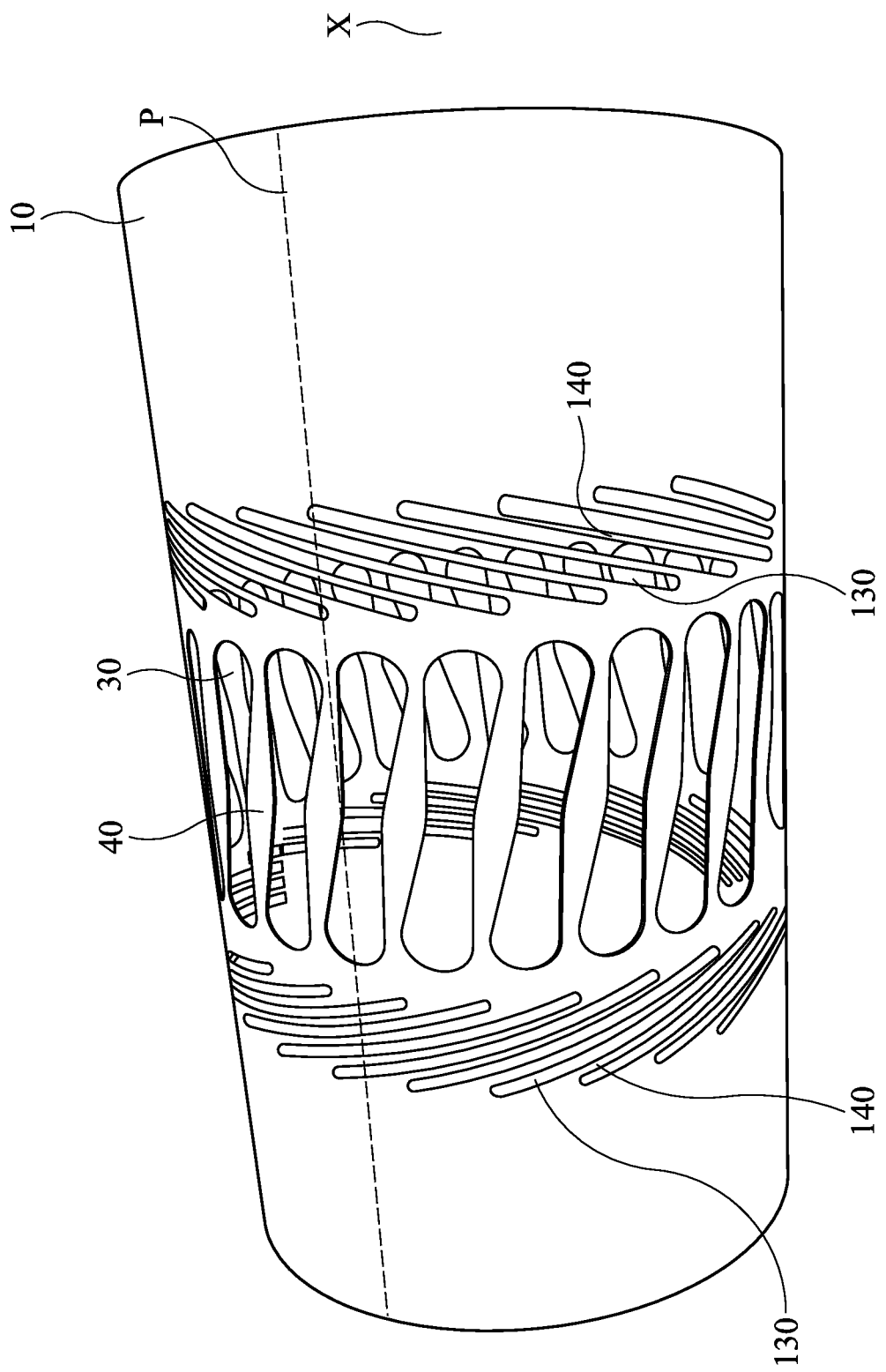
FIG. 8 is a line drawing evidencing another exemplary embodiment of a sealing inner sleeve with various longitudinal slots in a side view.
Figure 9:
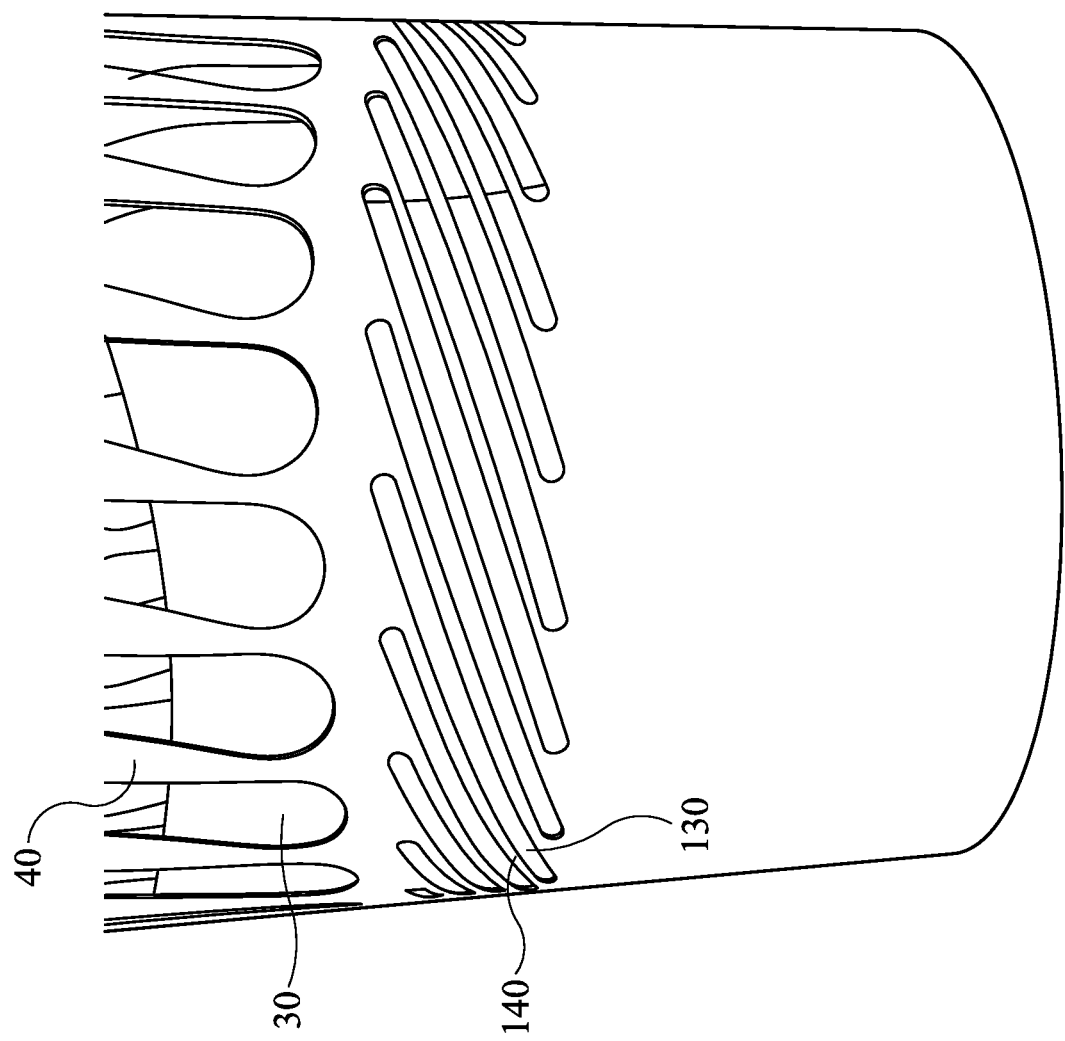
FIG. 9 is a line drawing evidencing a detailed view of the sealing inner sleeve shown in FIG. 8.

FIGS. 8 and 9 show another exemplary embodiment of a sealing inner sleeve 10. This exemplary embodiment is very similar to the sealing inner sleeve of FIGS. 6 and 7. However, the longitudinal slots 130 of the second group are divided into a first sub-group, which is placed in FIG. 8 at the left of the longitudinal slots 30 and into a second subgroup, which in FIG. 8 is placed at the right of the longitudinal slots 30. All longitudinal slots 130 of this second sub-group placed at the left of the longitudinal slots 30 are arranged with an angular offset in reference to the center axis X diagonally towards the left and the longitudinal slots 130, which are arranged at the right of the longitudinal slots 30, show an offset towards the center axis X, which points diagonally towards the right. In reference to a virtual level, which is positioned precisely in the center of the sealing inner sleeve 10 and orthogonal to the center axis X, a symmetric arrangement of the longitudinal slot 130 develops here of both subgroups. When once more considering a parallel P on the circumferential surface of the sealing inner sleeve 10, which extends parallel to the center axis X, it is discernible that this parallel P intersects four longitudinal slots 130 at the left of the longitudinal slots 30 as well as four longitudinal slots 130 at the right of the longitudinal slots 30 of the first group.

FIG. 9 shows an enlarged detail of the longitudinal slots 130 and the corresponding longitudinal webs 140 of the second group of FIG. 8.

LIST OF REFERENCE NUMBERS

10 Sealing inner sleeve
12 Band
14 End section
15 End section
16 Intermediate section
20 Locking device
21 Toothed rod
23 Stop
30 Longitudinal slot of the first group
31 End section
32 End section
33 Middle section
40 Longitudinal web of the first group
41 End section
42 End section
43 Middle section
50 Pipeline
130 Longitudinal slot of the second group
140 Longitudinal web of the second group
A Section
B1 Minimum width of 30
B2 Maximum width of 30
C1 Maximum width of 40
C2 Minimum width of 40
D Diameter
X Center axis
α Angular offset of the longitudinal slots of the first group β Angular offset of the longitudinal slots of the second group
Z Total length
P Parallel The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

We claim:

1. A sealing inner sleeve comprising two end sections and an intermediate section together forming a contiguous component, such that the sealing inner sleeve may be inserted into a pipe in order to seal leakages, such sealing inner sleeve comprising:

an annularly contracted and expandable band made from sheet steel, with the expandable band overlapping in a circumferential direction partially, and with a locking device allowing an increase in diameter of the sealing inner sleeve, however blocking any deformation in the opposite direction, and whereby a first group of longitudinal slots is arranged in the intermediate section, separated from each other and distanced by a first group of longitudinal webs arranged in the circumferential direction, wherein the first group of longitudinal slots and the first group of longitudinal webs are arranged with an angular offset from approximately 5 to 20 degrees in reference to a center axis of the sealing inner sleeve on a circumference of said sealing inner sleeve, and further comprising wherein the longitudinal slots of the first group are arranged between a first subgroup and second subgroup of longitudinal slots, such first subgroup and second subgroup together comprising a second group of longitudinal slots, and wherein such first subgroup points diagonally to the right in reference to the center axis and is arranged on one side of the first group of longitudinal slots, and such second subgroup points diagonally to the left in reference to the center axis and is arranged on the opposite side of the first group of longitudinal slots, such second group of longitudinal slots showing an angular offset in reference to the center axis from approximately more than 45° to less than 90°.

2. The sealing inner sleeve of claim 1, wherein the first group of longitudinal slots and longitudinal webs shows an angular offset amounting to approximately 10 degrees, and/or that the second group of longitudinal slots and longitudinal webs shows an angular offset in reference to the center axis amounting to at least approximately 75°.

3. The sealing inner sleeve of claim 1, wherein all longitudinal slots and longitudinal webs of the first group are arranged parallel in reference to each other.

4. The sealing inner sleeve of claim 1, wherein the longitudinal slots of the first group are at least approximately one to five times wider than the longitudinal webs of the first group in the circumferential direction of the sealing inner sleeve.

5. The sealing inner sleeve claim 1, wherein the longitudinal webs of the first group are wider in their central area than in their end sections.

6. The sealing inner sleeve of claim 1, wherein the intermediate section of the sealing inner sleeve amounts to approximately 0.2 to 0.5 of a total length Z, seen in the direction of the center axis of the sealing inner sleeve.

7. The sealing inner sleeve of claim 1, wherein the sealing inner sleeve shows approximately 10 to 120 longitudinal slots in the first group of longitudinal slots.

8. The sealing inner sleeve of claim 1, wherein the longitudinal slots of the second group are narrower than the longitudinal slots of the first group.

9. The sealing inner sleeve of claim 1, wherein the longitudinal slots of the second group show a width of approximately 3 to 7 mm and a length of approximately 10 to 15 cm, and are limited by longitudinal webs, which are approximately 1 to 5 mm wide.

10. The sealing inner sleeve of claim 1, wherein an area of the second group of longitudinal slots is smaller than an area of the first group of longitudinal slots in reference to a length of the sealing inner sleeve in the direction of the center axis.

\* \* \* \* \*